Figure 1:
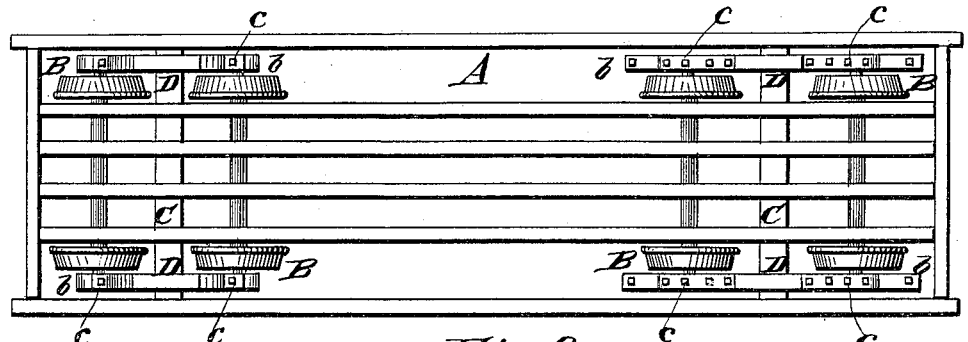

(No Model.)

G. RAINNIE.
SAFETY APPLIANCE FOR CAR TRUCKS.

No. 390,804. Patented Oct. 9, 1888.

WITNESSES:
Phil C. Dieterich
C. Sedgwick

INVENTOR:
G. Rainnie
BY Munn &Co.
ATTORNEYS.

UNITED STATES PATENT OFFICE.

GAVIN RAINNIE, OF PORTLAND, NEW BRUNSWICK, CANADA.

SAFETY APPLIANCE FOR CAR-TRUCKS.

SPECIFICATION forming part of Letters Patent No. 390,804, dated October 9, 1888.

Application filed January 12, 1888. Serial No. 260,566. (No model.)

*To all whom it may concern:*

Be it known that I, GAVIN RAINNIE, of Portland, in the county of St. John, Province of New Brunswick, and Dominion of Canada, have invented a new and useful Improvement in Safety Appliances for Car-Trucks, of which the following is a full, clear, and exact description.

This invention relates to safety-guard car-truck appliances suitable for any or all trucks used on locomotives, snow-plows, freight, passenger, and Pullman or other railroad cars.

The object of the invention will be best explained by the following statement: In the ordinary construction when a truck gets off the rails the principal trouble is that it almost invariably slues around, as the usual check-chains, if there happen to be any on the truck, require to be so long that they allow the truck to get almost square across the track, in which case said chains break and the position the truck is put in leads the car away from the rails and down the bank, if there be one at the place, and in nearly all cases causes the car to pass off or leave the usual friction devices on the truck which carry the weight of the car, which necessitates, before the truck can be got square again, the jacking of the car up to get it on the friction devices again, and if it be required to lift the truck as well, it is necessary to chain it up to the car and then to use the switch-rope connected to the engine to square the truck in order to give it the proper lead to conduct it back to the rails. After jacking up, however, and placing the car on the friction devices of the truck, the car is frequently moved only a short distance toward replacing it on the rails before it is off the friction devices again and there is nothing left to prevent it from sluing.

My invention obviates these defects, and consists in simply a heavy or strong bar, preferably a flat bar of refined iron, bent to suit the shape of the different trucks to which it is applied, and bolted or secured by screw-bolts or otherwise to the truck-frame, the bend in the bar being made so as to cause it to pass over the main stationary bolster or bolsters of the car, leaving a space of about two and a half inches (more or less) on the forward and rear sides to allow the truck to adapt itself to curves on the road, and, say, about two inches (more or less) above the top of the bolster. The operation of this bar, which forms the safety-guard appliance, will be hereinafter explained.

Reference is to be had to the accompanying drawings, forming a part of this specification, in which similar letters of reference indicate corresponding parts in all the figures.

Figure 2:
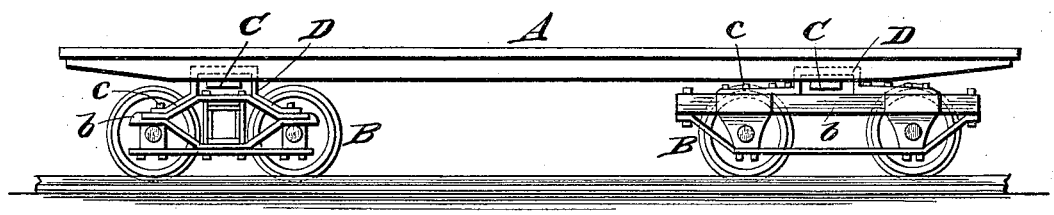
Figures 3, 4:
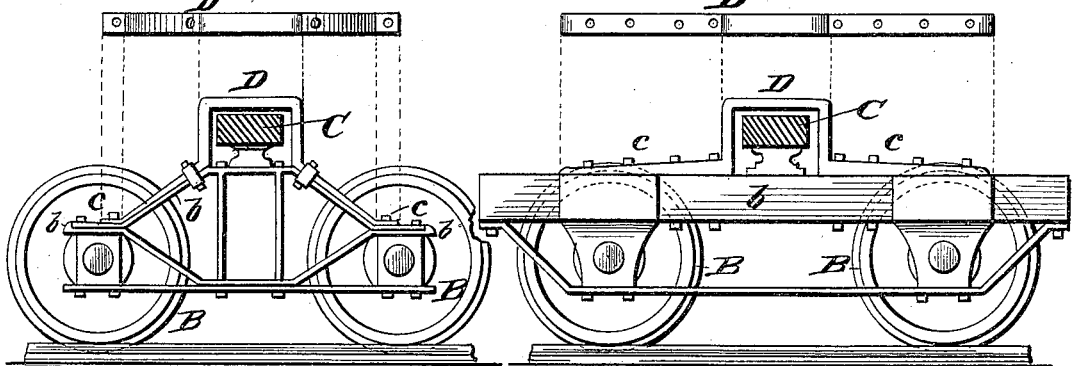
Figure 5:
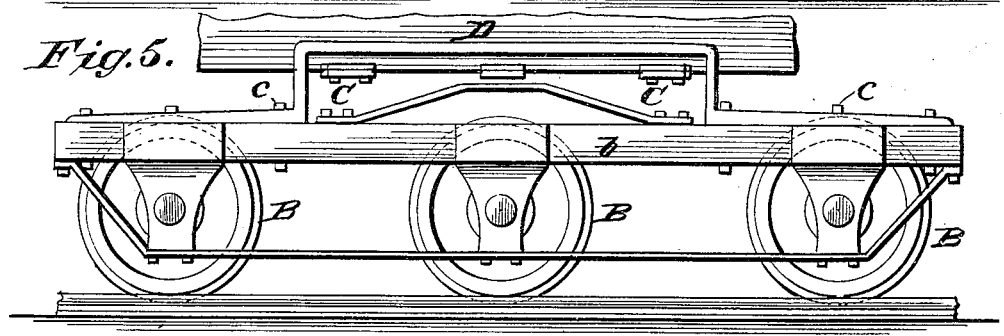

Figure 1 represents a plan view, and Fig. 2 a side view, of a flat railroad car and trucks, in part, with my invention applied. Fig. 3 is a plan view of the guard detached and side view of the same as applied to the truck-frame of a freight-car, the main stationary bolster being in section. Fig. 4 shows views corresponding to Fig. 3 of the invention as applied to a passenger-car truck. Fig. 5 is a side view showing the invention as applied to a Pullman-car truck.

Only such parts or details of the trucks and cars to which they are applied are here shown in the drawings as are necessary to explain my invention.

In Figs. 1 and 2, A is a flat car or frame thereof, having a truck with four wheels, B B, at or near each end, the frame $b$ of each truck being of the usual or any suitable construction. C C are the main stationary bolsters. D is the safety-guard appliance, which consists of a flat heavy bar of suitable iron bent to straddle, with lost space or in a loose manner, as hereinbefore specified and shown, the bolster C of each truck, and secured by screw-bolts $c\ c$, or otherwise, to the truck-frame $b$.

In Figs. 3 and 4 substantially the same arrangement is shown, as also in Fig. 5, excepting that in the latter, which shows the invention applied to a Pullman car in part, the invention is used upon a six-wheel truck and made to straddle in a loose manner, as before, the two iron bolsters C C, that are in the body of the car over each truck, and which, being so far apart, serve to distribute the guard D over more of the truck and nearer to the ends of it, which will be favorable to the action of the guard. So far as the invention, however, is concerned the two bolsters may be regarded as a single divided one.

From inspection of the drawings it will be seen that the guard D does not restrict the truck from adapting itself to curves on the track, and that there is ample room for the truck to play about and swivel, as necessary when running; but so soon as the truck leaves the rails and commences to slue the guard D brings up against the bolster on the forward side on one end and on the rear side on the other end, and thereby forms a complete lock; or, in other words, the truck can only slue just as far from the rail as the guard will allow it, and it will be kept in that position. Consequently the car cannot get far from the track.

By means of this safety-guard, then, the car is prevented from getting off its friction supports or devices, from sluing around, or getting away from the track. Furthermore, when the car is jacked up and the truck hanging to it by the guards D it may be slued by an ordinary bar to any angle that may be required, and by simply driving a wedge or piece of wood in between the guard and bolster it can be held firm in the position required to lead it back to the track.

Again, it frequently occurs that when the wheels leave the rails and the truck slues the king-bolt breaks, and as the truck then has nothing else left to hold it to the car except a small casting it either jumps out clear of the road altogether or passes back under the train and throws off or breaks up all the trucks in rear of the train, or throws the balance of the train off the track.

All cars, as usually constructed, simply set on their trucks without any means to keep them there in case of derailment excepting their own weight, the check-chains sometimes used, but now pretty generally discarded, being utterly worthless for the purpose in almost every case. The guards D, however, will effectually keep the cars on their trucks in case of derailment, and will also operate as a safety means in case of a broken wheel, as, for instance, in ordinary four-wheel trucks there will still be three wheels left to run upon, and the broken wheel cannot work down without twisting the body of the car, for the reason that the guard will hold it up.

This safety guard or appliance will prove a great saving to both life and property.

Having thus described my invention, what I claim as new, and desire to secure by Letters Patent, is—

1. In railroad-car and other like trucks, the combination, with the frame of the truck, of an attached bent safety-guard on the upper face of each side thereof, adapted to loosely straddle the stationary bolster or bolsters of the car or body carried by the truck, substantially as specified.

2. The combination, with the car or other like body having stationary bolsters C, and the swiveling trucks carrying said car or body, of the safety-guards D, secured to the frames of the trucks and bent to loosely straddle the tops and sides of the bolsters, essentially as and for the purpose or purposes herein set forth.

GAVIN RAINNIE.

Witnesses:
J. GORDON FORBES,
JOSEPH R. STONE.